Oct. 15, 1929.  W. W. KANTACK  1,731,669
LIGHTING FIXTURE
Filed May 5, 1928
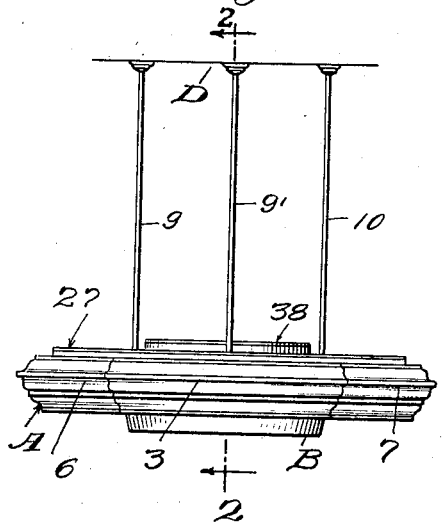
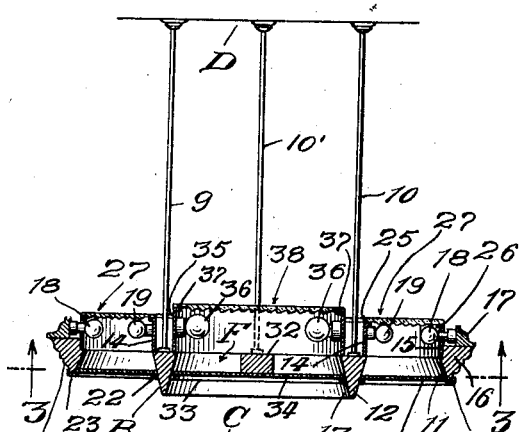
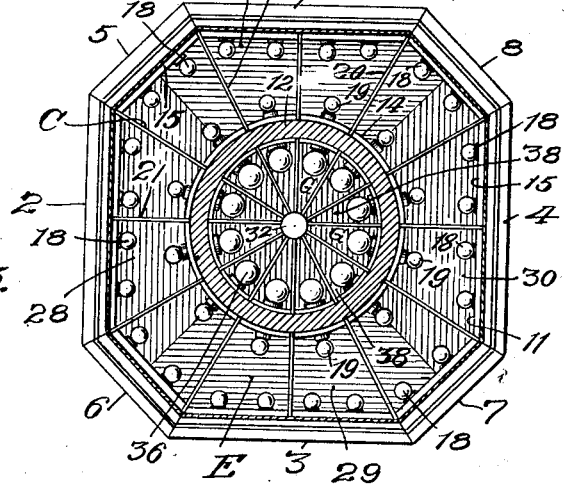
INVENTOR
Walter W Kantack
BY
Gustav Drews
ATTORNEY Patented Oct. 15, 1929

1,731,669

UNITED STATES PATENT OFFICE

WALTER W. KANTACK, OF ST. ALBANS, NEW YORK

LIGHTING FIXTURE

Application filed May 5, 1928. Serial No. 275,303.

This invention relates to lighting fixtures in general and more especially to suspended lighting fixtures for effecting a combination of direct and indirect illumination.

Among the objects of the present invention it is aimed to provide a suspended lighting fixture by means of which the normal path of vision of an occupant of the room in which such lighting fixture is suspended will form an oblique angle with the direct rays issuing from the lighting fixture.

It is still another object of the present invention to provide a lighting fixture whereby the light rays will so be guided to produce the greatest efficiency for both direct and indirect illumination and at the same time the path of the rays issuing from the fixture be so obstructed that they will be projected at an oblique angle to the normal path of vision of an occupant of the room in which the lighting fixture is suspended.

From the foregoing it will be seen that it is the general object of the invention to provide an improved lighting fixture for producing a combination of direct and indirect illumination which will effectively protect the eyes of the occupant of the room in which the fixture is located from receiving the direct rays issuing from the lighting fixture, so long as the occupant of the room will direct his eyes in a normal path of vision, assuming as an abnormal path of vision one in which the occupant would actually position himself directly beneath the lighting fixture and peer upwardly into the direct rays issuing downwardly from the fixture.

Among the objects of the present invention it is also aimed to provide a lighting fixture for producing a combination of direct and indirect illumination comprising a predetermined disposition of lamps, louvres, reflectors and frosted or other diffusing glass for producing a maximum efficiency of direct and indirect illumination and at the same time so guiding the rays of the light to protect the eyes of the occupant of the room in which the lighting fixture is located from receiving the direct rays issuing from the lamp so long as the occupant is directing his vision in a so-called normal path.

These and other features, capabilities and advantages of the present invention will appear from the subjoined detail description of one specific embodiment thereof illustrated in the accompanying drawings in which Figure 1 is a side elevation of the lighting fixture;

Fig. 2 is a section on the line 2—2 of Fig. 1; and

Fig. 3 is a bottom plan of the same.

In the embodiment illustrated there is provided an outer frame member A and an inner frame member B which are preferably connected to one another and in the present instance are connected to one another by the louvres C. The outer frame, in the present instance, is polygonal in shape having four elongated main sides 1, 2, 3 and 4 and four intermediate short sides 5, 6, 7 and 8. The inner frame B, in the present instance, is circular in shape. There are a plurality of the louvres C connecting the outer frame A with the inner frame B in the present instance, there being twelve.

The present lighting fixture is especially adapted to be suspended from a ceiling or the like, for which purpose the upper surface of the frame member B has connected thereto suitable suspension means, in the present instance four suspension rods 9, 9', 10 and 10' being illustrated, which are connected at their upper ends to the ceiling D.

The lower inner face 11 of the frame A preferably flares outwardly in a downward direction as shown. The louvres C extend from the frame A above the face 11 to the upper edges of the frame B and are preferably composed of opaque wall members.

The outer face 12 of the frame member B flares inwardly in a downward direction and the inner face 13 flares outwardly in a downward direction.

Extending from the upper outward end of the frame B there is formed a circular wall member 14 preferably composed of metal or the like which is interrupted by the louvres C. Opposed to the wall 14 there are formed a plurality of wall members 15 disposed between the louvres C and extending from the upper end of the face 11 of the frame A to and above the upper edge of the frame B. The outer face 16 of the frame A is preferably decorated, as shown. On the upper outer edge of the frame A there are preferably provided supporting members 17 to which the sockets of the lamps 18 are connected, which sockets preferably extend through the wall members 15 to permit the lamps 18 to be disposed adjacent to the inner faces of the wall members 15.

The circular wall member 14 is preferably provided with sockets to receive the lamps 19 which extend from the outer face of the wall member 14. In the present instance, the inner ends of the louvres C are spaced an equal distance from one another. The outer ends of the longer louvres C, to wit the louvers 20, are connected to the intersection of the shorter end members 5, 6, 7 and 8 with the longer end members 1, 2, 3 and 4, and the outer ends of the shorter louvres 21 are connected to the middle of the longer end members 1, 2, 3 and 4. In each of the twelve enclosures E formed by the louvres C and the interrupted inner wall member 14 and the outer wall members 15, there are provided three lamps, two lamps 18 extending from the outer wall members 15 and one lamp 19 extending from the interrupted wall member 14. It will also be noted that the lamps 18 and 19 extend into the enclosures E near the upper ends of the wall members 14 and 15, see Fig. 2.

Approximately at the middle of the face 12 there is formed a supporting ledge 22 parallel to the lower edge of the frame B, which supporting ledge 22 is in alinement with and parallel to the supporting ledge 23 secured to the lower edge of the frame A. The supporting ledges 22 and 23 are provided to support the frosted or other diffusing glass member 24 which encloses the space between the frames A and B. It is of course obvious that this plate member 24 may be composed of one or more pieces, as desired. In the present instance, the plate member 24 as shown is composed of one piece.

The upper edges of the wall members 14 and 15 are likewise provided with glass supporting ledges 25 and 26 respectively. On the ledges 25 and 26 a prismatic glass member 27 is provided having a lower prismatic surface and an upper smooth surface as shown in Fig. 2. This member 27 likewise may be composed of one or more pieces. In the present instance, see Fig. 3, there are provided a plurality of prismatic glass pieces, to wit four pieces, 28, 29, 30 and 31, the depressions in the lower faces of the pieces 28 and 30 being parallel with one another and disposed at right angles to the depressions formed in the bottom of the plates 29 and 31, these depressions forming the prismatic surfaces in the respective plates.

From the upper half of the inner face 13 of the frame member B there extend a plurality of louvres F inwardly to and connecting with the center piece 32. There are twelve louvres F, in the present instance, alined with the louvres C.

Disposed below the lower edge of the louvres F and secured to the inner face 13 of the frame B there is formed a glass supporting ledge 33 for supporting the sheet of frosted glass 34 substantially adjacent to the lower edges of the louvres F and center piece 32. Extending upwardly from the inner edge of the upper end of the frame B there is formed a circular wall member 35 which supports a plurality of lamp sockets to receive the lamps 36. There are twelve lamps 36 in the present instance which are disposed adjacent to the upper edge of the wall member 35, and each lamp 36 alines with an enclosure G formed by a pair of louvres F and the frame member B. The upper edge of the wall member 35 is provided with an inwardly extending supporting ledge 37 to receive the prismatic glass member 38 which has a lower prismatic surface and an upper smooth surface.

By means of the combination aforesaid, the prismatic glass members 27 and 38 will of course permit the rays from the lamps 18, 19 and 36 to pass through and be directed onto the ceiling D and spread over an extensive area thereof to produce indirect illumination. The inner prismatic surfaces of the glass members 27 and 38 in turn will serve as reflecting surfaces to receive the rays from the lamps 18, 19 and 36 and reflect them onto the frosted glass members 24 and 34 by which frosted members 24 and 34 the rays will be diffused and directed downwardly to produce direct illumination. The louvres C and F and frame members A and B cooperate with one another, and the location of the lamps 18, 19 and 36 to obstruct the passage of rays of light directly into the eyes of an occupant of the room when the eyes of such occupant are directed into the normal path of vision.

It is obvious that various changes and modifications may be made to the details of construction without departing from the general spirit of the invention as set forth in the appended claims.

I claim:

1. In a lighting fixture, the combination with an outer frame, of an inner frame, a plurality of louvres extending from the outer frame to the inner frame to connect the frames to one another, a plurality of lamps disposed in the enclosures formed by said louvres to guide the light rays of the lamps, supporting means secured to the lighting fixture for supporting the same in suspended position, louvres extending inwardly from said inner frame, and lamps secured to said inner frame and cooperating with said latter louvres to guide the light rays of said lamps.

2. In a lighting fixture, the combination with an outer frame, of an inner frame, a plurality of louvres extending from the outer frame to the inner frame to connect the frames to one another, a plurality of lamps disposed in the enclosures formed by said louvres to guide the light rays of the lamps, supporting means secured to the lighting fixture for supporting the same in suspended position, louvres extending inwardly from said inner frame, lamps secured to said inner frame and cooperating with said latter louvres to guide the light rays of said lamps, frosted glass secured to said frames below said lamps to diffuse the rays issuing from said lamps, and prismatic glass having lower prismatic surfaces secured to said frames above said lamps to permit some of the rays to issue upwardly and other rays to be reflected downwardly.

WALTER W. KANTACK.